United States Patent [19] [11] 4,233,678

Brady, III [45] Nov. 11, 1980

[54] SERIAL PHASE SHIFT BEAMFORMER USING CHARGE TRANSFER DEVICES

[75] Inventor: Jesse J. Brady, III, Austin, Tex.

[73] Assignee: The United States of America as represented by the Secretary of the Navy, Washington, D.C.

[21] Appl. No.: 19,806

[22] Filed: Mar. 12, 1979

[51] Int. Cl.[3] .......... G01S 3/80
[52] U.S. Cl. .......... 367/122; 367/123; 367/126
[58] Field of Search .......... 367/122, 123, 135, 126

[56] References Cited

U.S. PATENT DOCUMENTS

| | | | |
|---|---|---|---|
| 3,274,536 | 9/1966 | Abbott et al. | 367/122 |
| 3,370,267 | 2/1968 | Barry | 367/122 |
| 4,166,999 | 9/1979 | Brady, III | 367/122 |

OTHER PUBLICATIONS

White et al., "Sonar Signal Processing with CCD's," National Technical Information Publication #AD783703 May 1974, pp. 7-1 thru 7-19.

*Primary Examiner*—Richard A. Farley
*Attorney, Agent, or Firm*—Richard S. Sciascia; Harvey A. David

[57] ABSTRACT

A serial phase shift beamformer characterized by a charge transfer device for progressive clocked transfer of quadrature component analog samples of the scanned outputs of a multiplicity of transducer elements in a curved array. Weighting resistors effect scaling of the analog samples during parallel readout of X and Y component samples prior to summation of like components and derivation of the square root of the sum of the squares of the X and Y summations to provide formed beam amplitude signals.

9 Claims, 3 Drawing Figures

SERIAL PHASE SHIFT BEAMFORMER USING CHARGE TRANSFER DEVICES

BACKGROUND OF THE INVENTION

This invention relates generally to sonar systems, and more particularly to analog signal processing within high resolution systems so as to form directional beams. A continuous analog sampled data technique of beamforming has been used in sonar applications wherein the narrowband signal from each hydrophone is divided into its sine and cosine (quadrature) components, ($X_i$[t] and $Y_i$[t]). Once represented in this form, the phase shift operation required to cancel the equivalent time delay associated with the element's relative position can be achieved by the common vector rotation equations:

$$X_n = \cos\theta_i X_i + \sin\theta_i Y_i$$

$$Y_n = -\cos\theta_i Y_i - \sin\theta_i X_i$$

where:

($X_i$, $Y_i$) is the original quadrature pair, $\theta_i$ is the desired angle of rotation, and ($X_n$, $Y_n$) is the phase shifted quadrature pair.

To form a directional beam, the quadrature signals from each element are phase shifted such that planar acoustic signals arriving from the desired angular direction add coherently after phase shifting. To obtain the desired beamwidth and side lobe suppression, the phase shifted quadrature signals are amplitude shaded by a factor, $W_i$, according to their relative position in the array. The resulting signals from n elements are then linearly summed to form two equations:

$$X(t) = \sum_{i=1}^{n} W_i \cos\theta_i X_i(t) + W_i \sin\theta_i Y_i(t) \quad \text{Eq. (1)}$$

$$Y(t) = \sum_{i=1}^{n} W_i \cos\theta_i Y_i(t) - W_i \sin\theta_i X(t). \quad \text{Eq. (2)}$$

The magnitude of the resulting beam is:

$$Z(t) = \sqrt{X^2(t) + Y^2(t).} \quad \text{Eq. (3)}$$

A physical implementation of this method comprises a set of weighting and summing transformers. The signal from each array element is divided into its sine and cosine components to produce the $X_i$ and $Y_i$ outputs.

The weighting of each output is accomplished by scaling the number of turns on the weighting and summing transformers. The sign of the required weighting coefficient determines the sense of the winding. Since each transformer has two windings from each element, the output of the transformer is the sum of the weighted and shaded inputs to the transformer. One transformer performs the X summation as in Eq. (1), and the other performs the Y summation. Only one beam is formed with each set of hardware. U.S. Pat. No. 3,274,536 to F. R. Abbott et al is representative of such a system.

The beam may be steered by mechanically rotating the array to point in the desired direction. Alternately, the number of elements in the array can be increased, and, in the limit, elements can be spaced at intervals around the face of a cylinder for 360° coverage. By selecting the appropriate group of elements, the beam can be steered through 360°. This procedure results in the desirable effect of eliminating the delay associated with mechanical slewing.

In most applications, it is advantageous to form more than one beam during a pulse length, so that the sonar can "look" in more than one angular direction at a given range increment and still satisfy the Nyquist criterion. As the pulse length is shortened, the time available to multiplex between sets of elements decreases, so that it is impractical to have one continuous analog beamformer form many beams. In the limit, a beamformer is provided for each direction in which a beam is to be formed. If R components are required to form one beam and N beams are needed to cover a given area, R×N components are needed for the sonar. In addition, the output of each beamformer is usually multiplexed for a serial presentation of the N beam magnitudes. The implications for sonars with close element spacing and with large numbers of elements per beam are shown by the following example.

A sonar covering 120° is designed with a 150 μsec pulse length and the elements are spaced at 3° on the face of a cylinder. For each range increment, it is desired to inspect the output of 40 beamformers so that the entire 120° can be viewed. Assume that for the desired beamwidth and sidelobe suppression, 15 elements are used to form a beam. For one beamformer, two transformers are needed, each with 30 (2 times 15) windings on the primary. If 40 beamformers are needed, 1200 windings on 80 transformers will be required and over 2400 connections will be needed to make the transformers operational. In addition, 40 magnitude circuits are needed to convert the X and Y outputs to a single quantity. After the magnitude is calculated, the outputs are multiplexed to a single line for a serial output. The large number of components and the larger number of interconnections between components needed by this beamforming technique is a disadvantage when space and cost are considered.

A more efficient organization allows multiple beams to be formed in one beamformer in a time-serial fashion. One such architecture, U.S. Pat. No. 3,370,267 to H. J. Barry, sequentially sampled elements to 1-bit accuracy and shifted the samples through a shift register. The output of each stage had an appropriately chosen weighting resistor attached between it and a summing amplifier. The summing amplifier added all the weighted outputs together. In this manner, successive beams were formed by shifting the sampled data through the shift register. The formed beam had no phase shift correction for the cylindrical array used, and was limited in dynamic range by the coarse signal amplitude quantization.

Digital beamformers have also been proposed which use quadrature sampled data that is quantized in nonlinear steps. By using geometric encoding of data, multiplication operations become additions of geometric data. Both phase shifting and amplitude weighting are accomplished before the geometrically encoded data is converted to its linear representation for summation in a linear accumulator. Multiple beams were formed serially in one beamformer, with element samples serially shifted past one phase shifting and amplitude shading operator.

The basic algorithm used is based on taking two element samples spaced 90° apart in time at each element once each scan. The sampled values from estimates of the continuous quadrature components of the narrowband element signals. Provided that each element is sampled at least twice in 1/W seconds, where W is the signal bandwidth, the samples hold sufficient information for a valid phase shift and summation process similar to the continuous analog technique discussed earlier. The beamforming equations for the sampled case are:

$$X_m = \sum_{i=1}^{n} W_i \cos \theta_i X_{i+m-1} + W_i \sin \theta_i Y_{i+m-1} \quad \text{Eq. (4)}$$

$$Y_m = \sum_{i=1}^{n} W_i \cos \theta_i Y_{i+m-1} + W_i \sin \theta_i X_{i+m-1} \quad \text{Eq. (5)}$$

$$Z_m = \sqrt{X_m^2 + Y_m^2}, \quad \text{Eq. (6)}$$

where $X_i$ is the first sample from element 1, $Y_i$ is the second sample from element i, taken ¼ cycle later, n is the number of elements used to form a beam, $X_m$ is the real part of the $m^{th}$ beam formed, $Y_m$ is the quadrature part of the $m^{th}$ beam formed, and $Z_m$ is the beam magnitude of the $m^{th}$ beam.

For a cylindrical array, the set of element phase shift values for each beam is identical to the set for the next beam, so that one set of values is used for all beams formed. If the quadrature sampled element values are applied in serial order to the phase shifting device, beams will be produced with each added element pair ($X_i$, $Y_i$). This is directly analogous to the cross correlation process. Disadvantages of this method include the need for analog to digital conversions, the added error introduced by geometric quantization, and the relative slowness of the beam formation because of the serial element shading technique of the processor.

SUMMARY OF THE INVENTION

It is a principal object of this invention to provide an improved analog beamformer for sonar systems, which will overcome or avoid most or all of the disadvantages of the prior art beamformers.

It is another object of this invention to provide an analog, phase shifting beamformer, useful with high resolution cylindrical arrays to form directional beams with a minimum of electronic hardware or components.

Still another object is the provision of a sonar beamforming system of the foregoing character that yields increased capabilities of multiple beam formation.

Yet another object is to provide a sonar beamforming system utilizing CTC (charge transfer circuit) means to hold a series of analog sample values for effecting phase shift processing.

As another object, the invention aims to provide a high resolution sonar beamformer wherein all beams are formed in the same hardware, thereby resulting in close matching of beam characteristics and high efficiency.

Other objects and many of the attendant advantages will be readily appreciated as the subject invention becomes better understood by reference to the following detailed description, when considered in conjunction with the accompanying drawings.

DESCRIPTION OF THE PREFERRED EMBODIMENT

Figure 1:
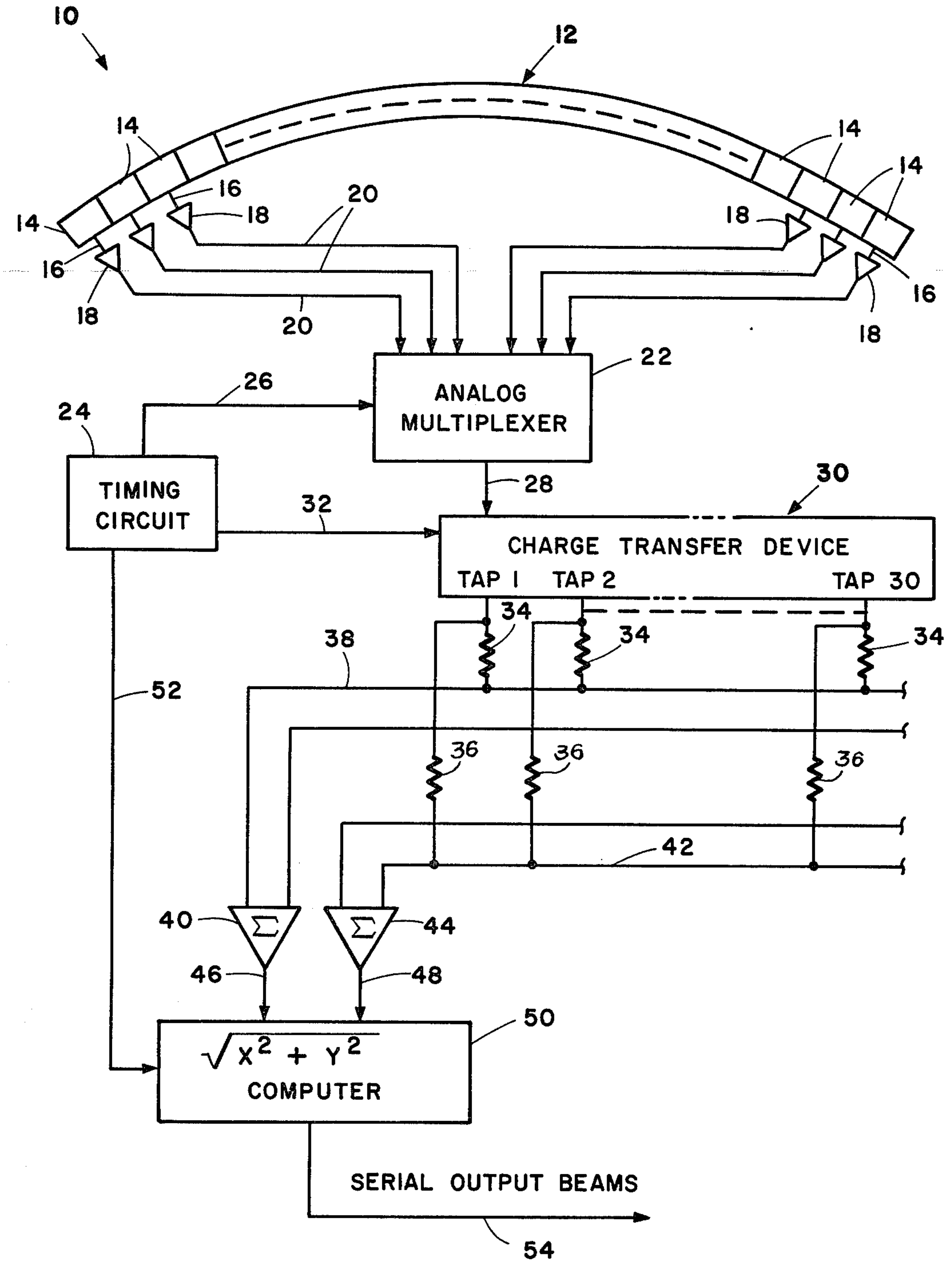
FIG. 1 is a diagrammatic illustration, in block form, of a high resolution sonar embodying the present invention.

Referring to FIG. 1, a high resolution sonar system, generally indicated at 10, comprises a cylindrically curved array 12 of electroacoustic transducer elements 14, say 48 in number, for example. Each of the elements 14 serves as a hydrophone for converting received portions of advancing acoustic wavefronts into corresponding electrical analog signals. It will be understood, of course, that the elements 14 may also serve as acoustic projectors. The electrical output of each element 14 is applied, as shown by lines 16, to a corresponding one of a like plurality of preamplifiers 18. The outputs of the preamplifiers are connected, as shown by lines 20, to an analog multiplexing means 22.

A timing circuit 24, connected via line 26 to the multiplexer, controls the scanning of the amplified outputs of the elements 14 so as to effect a predetermined scanning of the array 12 as will be discussed more fully hereinafter.

The output of the multiplexer means 22, represented by line 28, comprises the scanned analog outputs in serialized form and is applied as an input to a multiple stage charge transfer device 30. The device 30 may comprise one of a number of known charge transfer devices or "bucket brigade" devices that effect a serial transfer of analog signal, usually in the form of a capacitive charge, from stage to stage, and which can be non-destructively read out at a corresponding plurality of output taps. In this example consider the device 30 to comprise a serial in, parallel-out 64 stage unit of type TAD-32 of Reticon, Inc.

The timing circuit 24 is further connected, as shown by line 32, to the charge transfer device 30, and provides clocking signals to control the times at which samples are taken of the analog signal values provided by the multiplexer, and at which the analog samples are shifted to succeeding stages.

The signal values are sampled at discrete times and progress serially down the 64 stages with each rising edge of a transfer clock. At each stage the sample value in the holding capacitor is non-destructively read out by a source follower connected to an external pin. The 64 stages are internally grouped in 2's by connecting alternate source follower outputs together, giving a 32 stage tapped delay line. This dual connection provides a continuous readout of the sample value during both halves of the transfer clock cycle.

Each of the thirty-two stage output taps of the charge transfer device 30 is connected to a pair of corresponding weighting resistors 34, 36. The resistors 34 are connected via line 38 to a first or X component summing amplifier 40, while the resistors 36 are connected via line 42 to a Y component summing amplifier 44. The other or reference connections to summing amplifiers 40 and 44 are represented by lines 39 and 41, respectively, and are connected to ground potential or other suitable reference level as is common practice with operational amplifier circuits.

The outputs of the summing amplifiers 40 and 44 are applied in parallel, as shown by lines 46, 48 to an analog computer 50 for approximating the square root of the sum of the squares of the X and Y inputs. The computer 50, which may comprise a well known operational amplifier arrangement, is conveniently clocked or enabled by signals from the timing circuit 24 via line 52 and provides its output, line 54, as amplitude signals representing serial output beams.

MODE OF OPERATION

Figure 2:
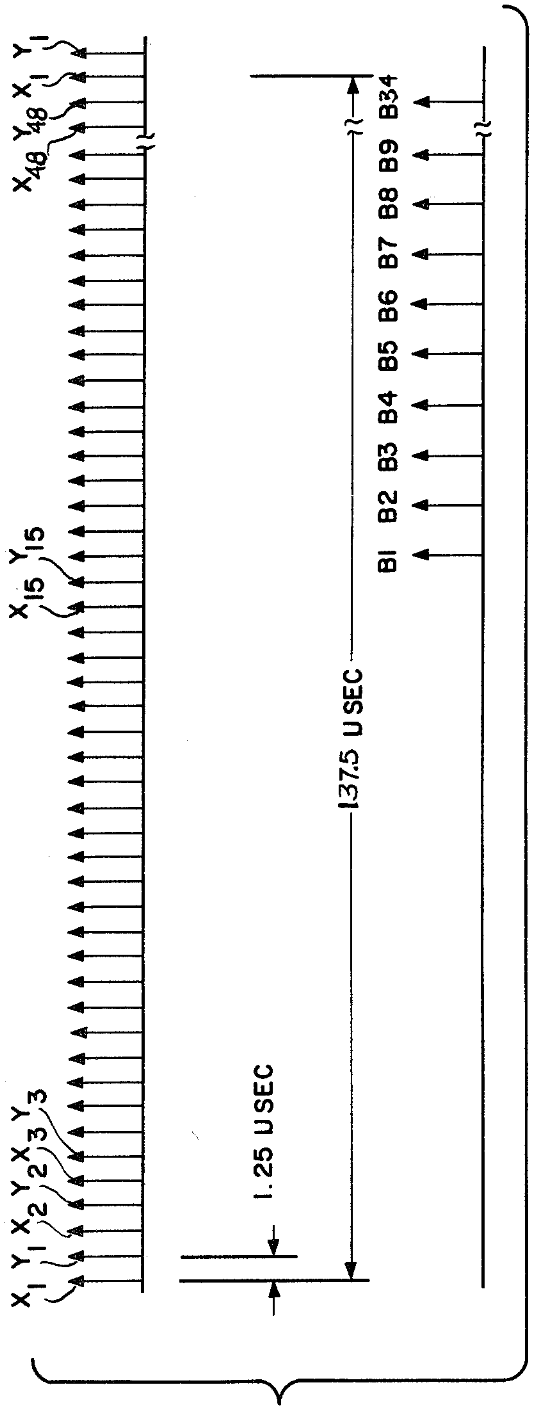
FIG. 2 is a graphic illustration showing relative timing of element samples and beam outputs.

It is assumed for comparison of this example to the prior art example given in the background discussion, that the array 12 is built with 200 Khz elements 14 spaced at 3° intervals around its circumference. The forty-eight preamplifier channels 20 are scanned in order by the timing circuit 24. As each preamp signal appears at the output 28 of the multiplexer 22, the charge transfer device 30 is clocked twice, taking two samples. The clock waveforms required are two complementary square waves which are easily generated. The samples are spaced at $\frac{1}{4} f_o$, which in this case is 1.25 μsec for a 200 kHz carrier. The relative timing of the samples is shown in FIG. 2. As each new sample is entered, earlier samples shift one stage down the charge transfer device. Fifteen element quadrature pairs are used to form a beam. Once fifteen (X,Y) pairs have been entered into the charge transfer device 30, the samples at taps one through thirty are aligned with the correct weighting resistors 34, 36. The weighting resistors attached to each tap are selected to be scaled versions of the calculated coefficient $W_i \cos \theta_i$ value resistor attached. The sample voltage appearing at the tap is effectively scaled or multiplied by the coefficient or weighting resistor.

The current flowing through the weighting resistors are summed on the two differential busses 38, 42 to generate the equations:

$$X = \sum_{i=1}^{15} X_i \cos \theta_i W_i + Y_i \sin \theta_i W_i$$

$$Y = \sum_{i=1}^{15} Y_i \cos \theta_i W_i - Y_i \sin \theta_i W_i$$

After summation, the magnitude of the beam is calculated by an approximation to $\sqrt{X^2+Y^2}$. The result is the beam amplitude for the first beam.

With each new element (X,Y) pair shifted into the charge transfer device, a new beam is formed at the output 54. In the example case, 34 beams are produced each time the elements are scanned. For each element added to the array one additional beam can be formed. Since the amount of beamformer hardware remains relatively fixed as more beams are formed, the efficiency of the technique is greater as the number of beams increases. Because all elements in the array must be scanned once per pulse length, the number of elements times the channel rate determines the minimum allowable pulse lengths (in this case, 137.5 μsec). In all but the highest resolution sonars, this is not a limitation.

The primary advantage of this method over the example method using transformers is that all beams are formed in one set of hardware. The efficiency afforded by this method is extremely beneficial when a large number of beams are to be formed. Additionally, all beams formed have identical spatial characteristics.

When compared to geometric sampling beamformers, this invention holds several advantages. First, element samples are retained in their analog form inside the charge transfer device. This reduces the complexity and power consumption drastically by eliminating the high speed analog to digital converter and sample and hold amplifier. In addition, the multiplications by $W_i \cos \theta_i$ are accomplished with scaling resistors which are much more reliable and less costly than the equivalent multipliers in digital form. All multiplications needed for forming one beam are done in parallel at the same time, rather than serially as in the digital beamformer. This critical point in architecture is often the limting speed factor in the digital implementation.

Figure 3:
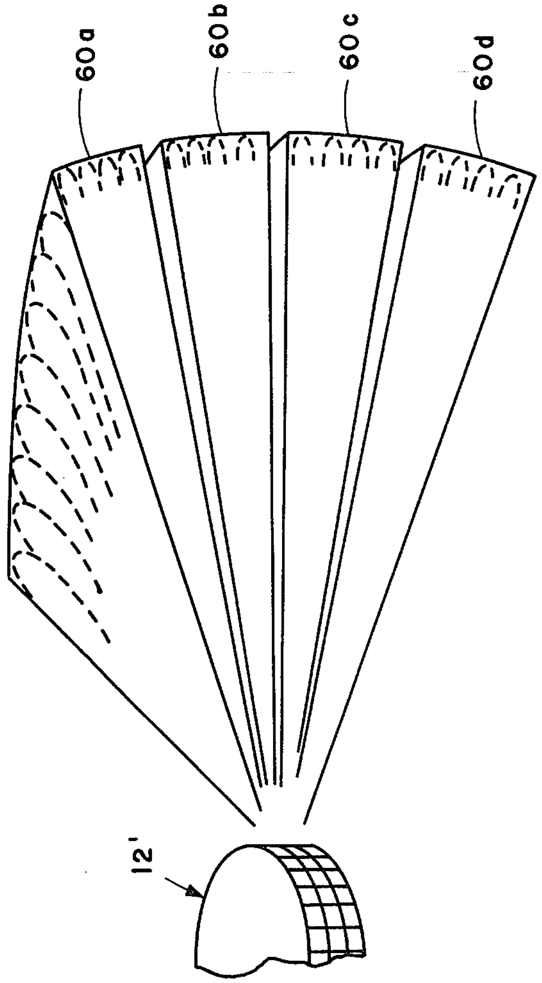
FIG. 3 is a view illustrating production of vertical fans of beams with like horizontal characteristics.

By connecting more than one set of resistors to the taps of the charge transfer device, multiple beams can be formed in parallel with no additional charge storage capacity. This allows beams to be steered both horizontally and vertically using the same charge transfer device. One such application, illustrated in FIG. 3, would be to produce a plurality, say four, vertical fans of beams ***60a*, *60b*, *60c*, and *60d* each composed of horizontal beams of like dimensions. Of course, an array 12'** would be required that has vertical rows of transducer elements.

As an alternative approach, the invention contemplates use of separate charge transfer devices to hold the X samples and Y samples. This approach reduces the rate at which the samples are clocked into each charge transfer device by a factor of two. This slower rate allows a longer settling time for the input data so that more accurate samples can be taken. This may increase the effective dynamic range of input signal that the beamformer can process if many beams are being formed. The formation of split beams is simplified by this expedient. In the horizontal dimension, the split beam process involves using the right half elements of an aperture to form a right half beam and the left half elements to form a left half beam. Since element samples are entered into the charge transfer device in serial fashion from the rightmost to leftmost element, the summation process can be broken into two summations. The dividing line is chosen to be the middle of the charge transfer device storage locations so that the left and right half elements are summed separately. Note that both sum beam and split beams can be formed at the same time using a single charge transfer device in the same manner as described for generation a plurality of vertical beams. Longer delays can, of course, be obtained by using a charge transfer device having more stages or by feeding the serial output of the device 30 as the input to one or more additional similar devices.

Obviously, other embodiments and modifications of the subject invention will readily come to the mind of one skilled in the art having the benefit of the teachings presented in the foregoing description and the drawing. It is, therefore, to be understood that this invention is not to be limited thereto and that said modifications and embodiments are intended to be included within the scope of the appended claims.

What is claimed is:

1. A sonar beamformer for use with an array comprising a multiplicity of transducer elements for providing electrical analog signals corresponding to acoustic energy impinging thereon, said beamformer comprising:

timing means for generating trains of time related clock signals;

analog multiplexer means, responsive to first clock signals, for scanning said array elements in predetermined order and generating a serialized output of the analog signals thereof;

plural stage means, responsive to second clock signals, for taking analog samples of said multiplexer means output and shifting of said samples to successive stages for parallel read-out of said analog samples;

weighting means, connected to each of said stages, for providing scaled analog samples in accordance with the relative position of the corresponding elements in the array; and summing means, responsive to said weighted analog samples, for providing summations of said scaled analog samples.

2. A sonar beamformer as defined in claim 1, and wherein:

said plural stage means comprises at least 2n stages, where n is the number of said elements used to form a beam, said stages being connected in pairs to n output taps; and said plural stage means further being responsive to said second clock signals to take said analog samples as quadrature pairs, each quadrature pair comprising X and Y component analog samples of the scan output of one of said elements and separated by 90° in time.

3. A sonar beamformer as defined in claim 2, and wherein:

said plural stage means comprises a charge transfer device.

4. A sonar beamformer as defined in claim 3, and wherein:

said weighting means comprises resistive means connected to said taps.

5. A sonar beamformer as defined in claim 4, and wherein:

said resistive means comprises at least n first resistors, each connected to one of said n taps and n second resistors, each connected to one of said n taps.

6. A sonar beamformer as defined in claim 5, and wherein:

said summing means comprises a first summing means connected to each of said first resistors for providing a first summation output corresponding to summation of scaled X component analog samples, and a second summing means connected to each of said second resistors for providing a second summation output corresponding to summation of scaled Y component analog samples.

7. A sonar beamformer as defined in claim 6, and further comprising:

means, responsive to said first and second summation outputs, for providing formed beam output signals corresponding substantially to the square root of the sum of the squares of said first and second summation outputs.

8. A sonar beamformer as defined in claim 7, and wherein:

said second clock signals comprise two complementary square waves.

9. A beamformer as defined in claim 8, and further comprising:

additional resistance means connected to each of said taps, additional summing means connected to said additional resistance means, and additional means for providing addition formed beam output signals, whereby said beamformer provides a plurality of beams simultaneously.

* * * * *